Nov. 18, 1958 — O. E. BROOME — 2,860,570
OUTDOOR COOKERS

Filed June 11, 1956 — 3 Sheets-Sheet 1

Oscar E. Broome
INVENTOR.

Nov. 18, 1958     O. E. BROOME     2,860,570
OUTDOOR COOKERS
Filed June 11, 1956     3 Sheets-Sheet 2
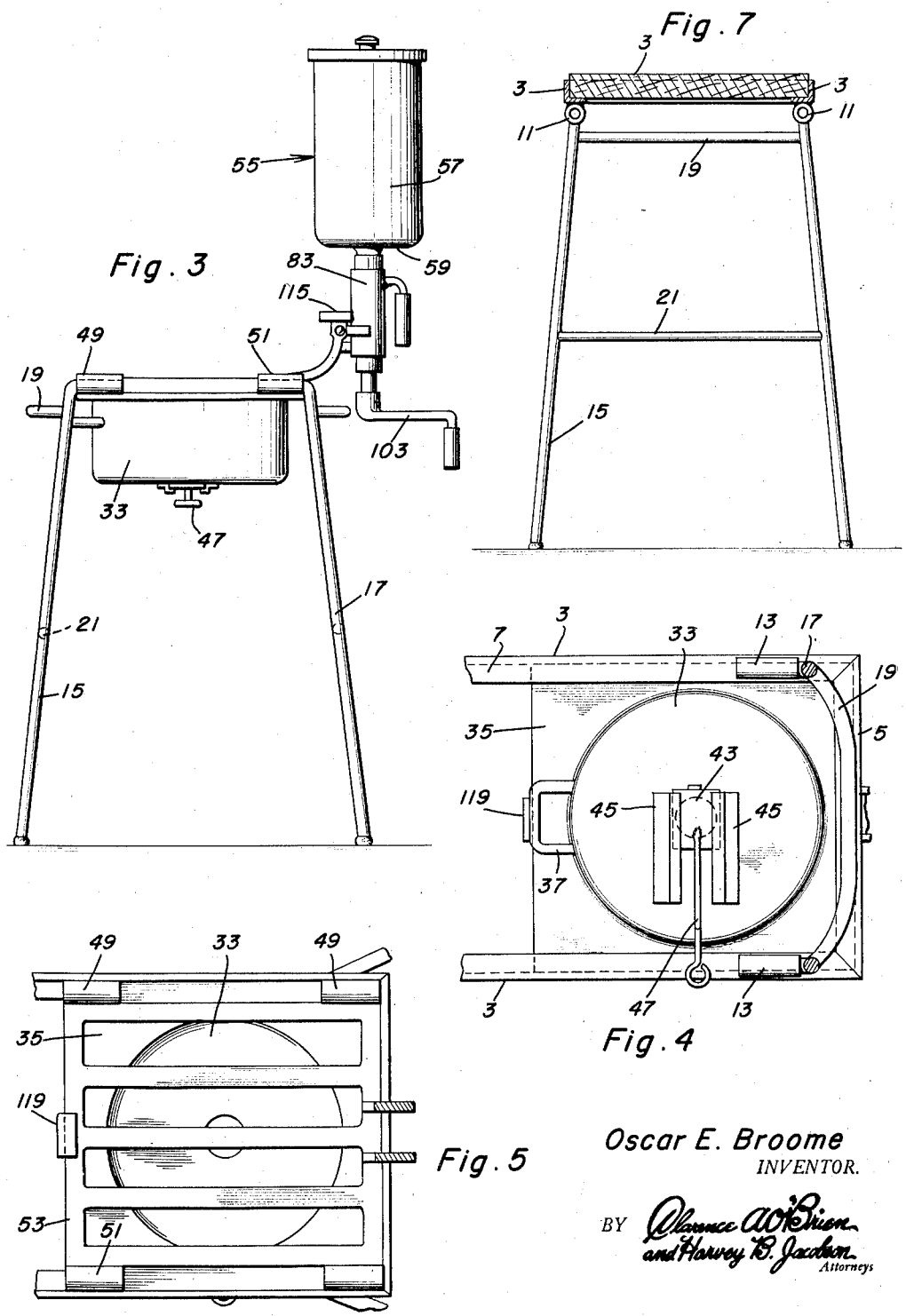
Oscar E. Broome
INVENTOR.

Nov. 18, 1958  O. E. BROOME  2,860,570
OUTDOOR COOKERS
Filed June 11, 1956  3 Sheets-Sheet 3
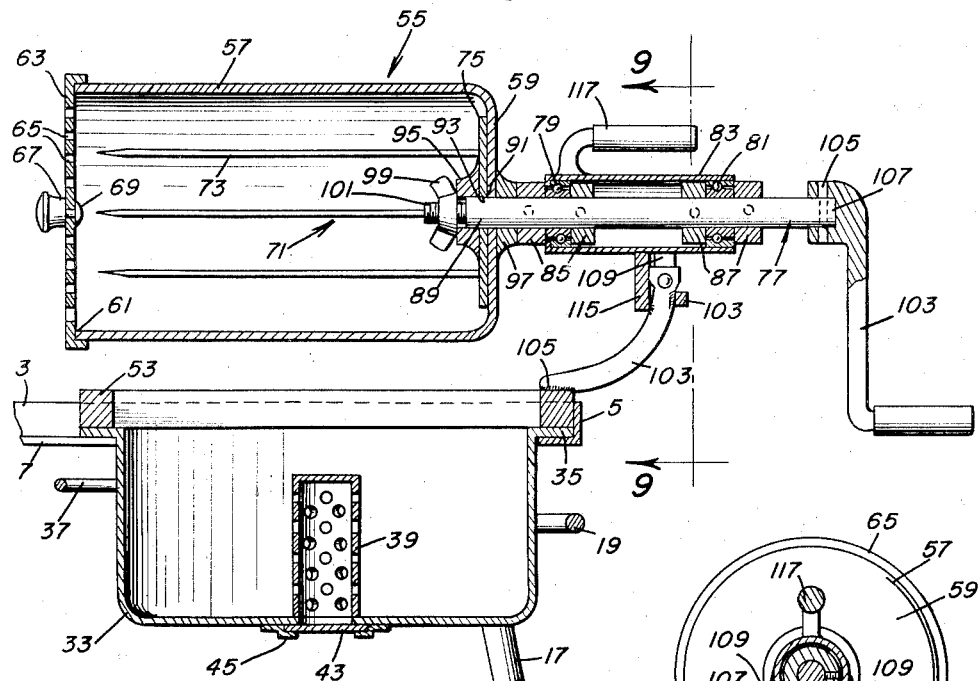
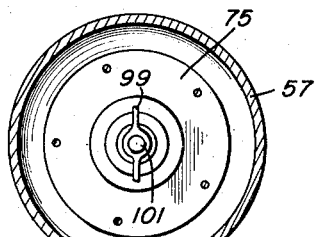
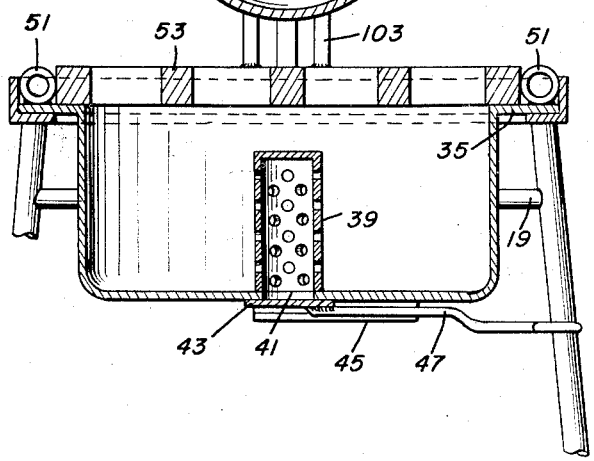
Oscar E. Broome
INVENTOR.

United States Patent Office 2,860,570
Patented Nov. 18, 1958

2,860,570

OUTDOOR COOKERS

Oscar E. Broome, Detroit, Mich.

Application June 11, 1956, Serial No. 590,574

1 Claim. (Cl. 99—421)

My invention relates to improvements in outdoor cookers for cooking meats over charcoal, at picnics, camps and in touring.

The primary object of my invention is to provide a knockdown cooker especially constructed for setting up at a chosen site easily and quickly to provide a table, a grid for barbecue cooking and a rotisserie cooking unit.

Another object is to provide a cooker embodying a grid and a rotisserie cooker unit either of which may be used over a single fire pot, the rotisserie cooking unit being swingably mounted for swinging to one side of the grid out of the way for cooking on the grid.

Still another object is to provide in a cooker for the above purposes for rotisserie cooking on revolving spit rods either in the open or in an oven.

Yet another object is to provide in such a cooker a frame supporting a table panel as a cooking accessory and also supporting a fire box having a grid mounted thereon and supporting the rotisserie cooking unit and to provide supporting legs for the frame detachable therefrom and attachable to the fire box so that the frame may be removed and the fire box, grid, and rotisserie cooking unit used alone to provide a shorter cooker to take up less space.

Yet another object is to provide a cooker for the foregoing purposes which is of simple durable construction, safe to use, and economical to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a view in end elevation with the rotisserie cooking unit swung into and out of the way position and the supporting legs attached to the fire box;

Figure 4 is a fragmentary enlarged view in bottom plan partly in horizontal section and taken on the line 4—4 of Figure 1;

Figure 5 is an enlarged fragmentary view in plan partly in horizontal section and taken on the line 5—5 of Figure 1;

Figure 6 is an enlarged fragmentary view in vertical longitudinal section taken on the line 6—6 of Figure 2;

Figure 7 is a view in vertical transverse section taken on the line 7—7 of Figure 1;

Figure 8 is an enlarged fragmentary view in vertical transverse section taken on the line 8—8 of Figure 1, and Figure 9 is a fragmentary view in vertical transverse section taken on the line 9—9 of Figure 6.

Figure 1:
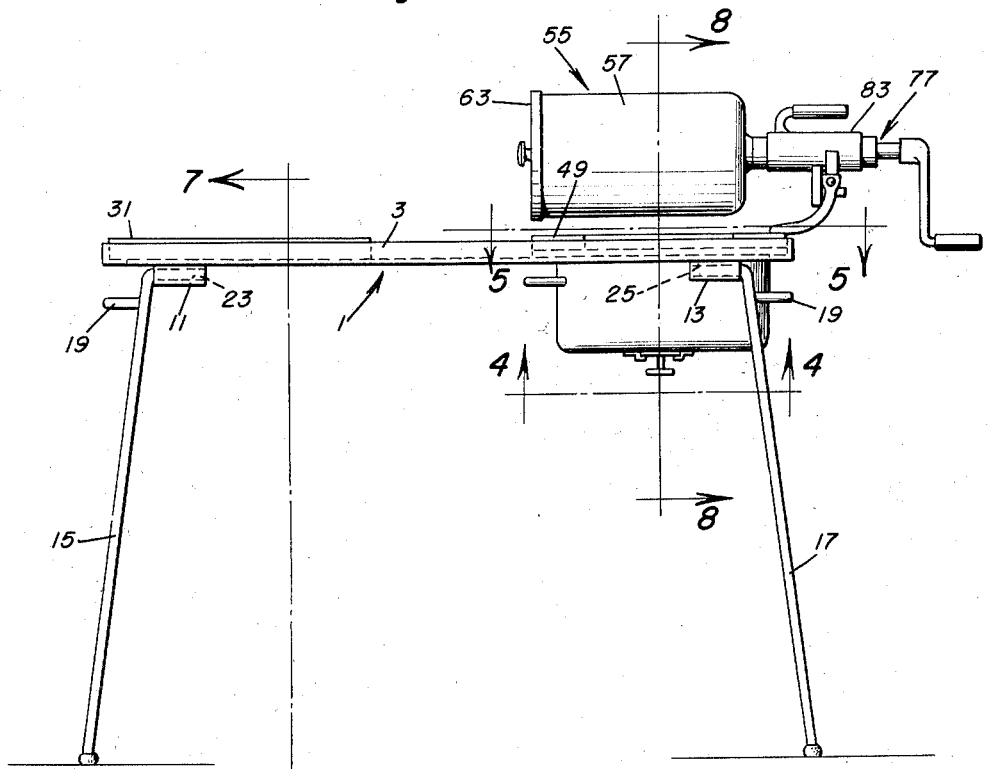
Figure 1 is a view in side elevation of the cooker with the supporting legs attached to the frame.
Figure 2:
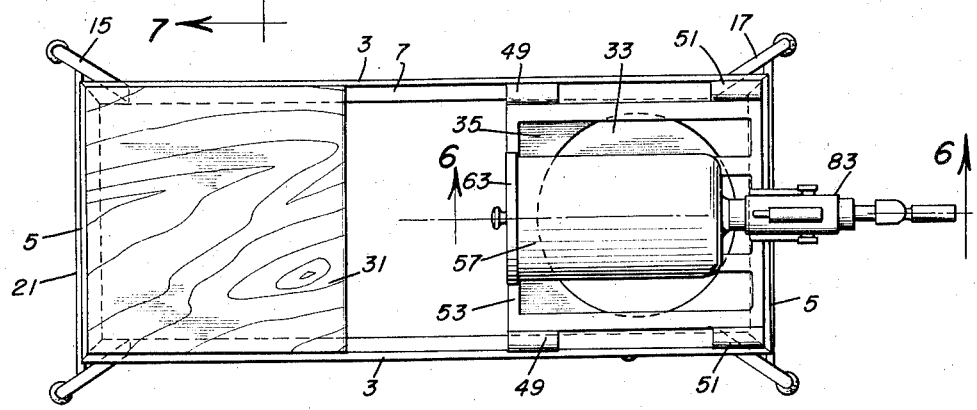
Figure 2 is a view in plan.

Referring to the drawing by numerals, the frame 1 of the cooker is oblong and rectangular in shape, formed of side and end angle bars 3, 5 forming an internal ledge 9 on said frame and is provided with a pair of longitudinal bottom sockets 11, 13 at its ends and on each side bars 3.

Pairs of end legs 15, 17 are provided for the frame 1. The pairs of legs 15, 17 flare downwardly relatively are connected together in each pair by upper and lower cross braces 19, 21 and are provided with longitudinal upper ends 23, 25 removably slidably fitting in the pairs of sockets 11, 13. Lateral pairs of handles on the pairs of legs 15, 17 facilitate removal and detachment thereof from the frame and are provided by the braces 19, 21.

A square table panel 31 is removably fitted in the frame 1 at one end thereof to seat on the ledge 7 and slide in said frame.

A substantially circular open top fire box, or pot 33 is removably supported in the other end of the frame 1 by a lateral rectangular rim flange 35 on said box seating on the ledge 7, and is provided with a lateral handle 37 for removing and replacing the same. A vertical perforated draft flue 39 extends upwardly in the fire box 33 from a central bottom draft opening 41 in said box to facilitate burning of fuel such as charcoal in the fire box. A damper slide 43 for variably closing the opening is slidably mounted in guides 45 on the bottom of the fire box 3 and provided with a suitable operating handle 47. Pairs of sockets 49, 51 like the sockets 11, 13 are provided on the rim flange 35 of the fire box at the corners and opposite sides of the fire box receiving the ends 23, 25 of the pairs of legs 15, 17 to attach said legs to said fire box 33 when it is removed from the frame 1, whereby the frame 1 may be dispensed with and the fire box directly supported by said legs to elevate said box and parts carried thereby and presently described.

A square grid 53 removably seats on the rim flange 35 between the pairs of sockets 49, 51 and extends over the top of the fire box 33 by which it is horizontally supported.

The rotisserie cooking unit designated generally by the numeral 55 comprises an elongated cylindrical oven 57 having a closed bottom end 59, and an open entrance end 61 closed by a laterally flanged lid 63 removably frictionally fitted over said end 61 and perforated as at 65 for escape of steam and vapors out of said oven. A suitable handle knob 67 is attached to said lip 63 centrally thereof by a screw 69.

A rotary spit unit designated generally by the numeral 71 is provided in the oven 57 and comprises a circular series of parallel spit rods 73 extending longitudinally in said oven 57 and suitably fixed at corresponding ends thereof to a supporting disk 75.

Means is provided for rotatably and detachably supporting the oven 57 and spit rod unit 71 horizontally over the grid 53 in overhanging spaced relation thereto comprising a rotary shaft 77 extending axially outwardly from the bottom end 59 of the oven 57 and which is journaled through a pair of anti-friction bearing units 79, 81 suitably fixed in the opposite ends of a mounting sleeve 83 for said shaft. Pairs of set collars 85, 87 on the shaft 77 at opposite sides of the bearing units 79, 81 prevent endwise play of said shaft. The shaft 77 extends outwardly from both ends of the sleeve 81 and the oven 57 and spit unit 71 are detachably attached to one end 89 of said shaft 77 to extend coaxially therefrom by the means described in the following paragraph.

The end 89 of the shaft 77 extends through axial openings 91, 93 in the bottom end 59 of the oven 57 and the disk 75 and said end 59 and disk 75 are interposed and clamped between a pair of collars 95, 97 on said shaft by a wing nut 99 on a reduced terminal portion 101 on said shaft, and by engagement of said collar 97 with one of the set collars 85 of the pair. A hand crank 103 secured by a pin 105 on the other end 107 of shaft 77 provides for rotating said shaft to rotate the oven 57 and the spit unit 71.

The sleeve 83 is mounted on one side of the grid 53 for swinging from horizontal position into vertical overbalanced position to correspondingly swing the oven 57 and spit rod unit 71. For this purpose a pair of opposite bracket arms 103 curve upwardly and outwardly from one side of the grid 53 and are welded thereto as at 105 and provided with bifurcated upper ends 107. A pair of depending lugs 109 on an intermediate portion of the sleeve 83 are pivoted in said ends 107 by horizontal pins 111. A cross bar 113 extends between the bracket arms 103 and acts as a stop limiting swinging of the sleeve 83 into overbalanced vertical position in which the oven 57 and spit rod unit 71 are swung outwardly of and to one side of the grid 53 clear thereof. A radial stop flange 115 on the sleeve 83 engages said arms 103 and limits swinging of the sleeve 83, oven 57 and spit rod unit 71, into horizontal position. A handle 117 on said sleeve 83 provides for swinging the same to swing said oven 57 and spit rod unit 71.

As will be apparent, the rotisserie cooking unit 55 and grid 57 may be removed as a unit for filling of the fire box 33 with fuel and then be replaced. The oven 57 and spit rod unit 71 of the rotisserie cooking unit 55 may be swung into vertical position as described to clear the grid for cooking thereon, as shown in Figure 3, or said oven 57 and spit rod unit 71 may be swung down into horizontal position over the grid 53 and fire box 33 for rotisserie cooking by heat from said box.

By removing the wing nut 101 the spit rod unit 71 may be removed out of the oven 57 and the end 59 of the oven 57 clamped between the collars 95, 97 for use of the oven without said unit 71. On the other hand the oven 57 may be removed by removing said wing nut 101 and the disk 75 of the spit rod unit 71 clamped by the wing nut 101 between said collars 95, 97 for use of the spit rod unit in the open without the oven.

The cooker may be used with the frame 1 and the legs 15, 17 attached thereto as previously described for supporting the table panel 31 for sliding toward and from the grid 53 for loading and unloading meats onto said grid, or the legs 15, 17 may be directly attached to the fire box 33 in the manner previously described and as shown in Figure 3 so that said frame may be dispensed with and the cooker will take up less space.

A stop lug 119 on the flange 35 of the fire box 33 is provided for centering the grid 53 over said box longitudinally of the frame 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An outdoor cooker comprising a fuel containing fire pan having a lateral surrounding rim flange, means supporting said pan in elevated position, a grid removably disposed on said flange over said pan for cooking thereon, a cylindrical oven for rotisserie cooking having a closed end, a shaft for rotating said oven having one end extending through said closed end, clamp means on said shaft for detachably attaching said closed end to said end of the shaft, bearing means journaling said shaft, and means pivotally mounting said bearing means on an edge of said flange for vertical swinging to correspondingly swing said shaft for swinging said oven into horizontal position over said grid for heating through the grid or into upright position at one side of the grid for cooking on the grid, said pan having a central perforated draft flue upstanding therein.

References Cited in the file of this patent

UNITED STATES PATENTS

| | | |
|---|---|---|
| 2,506,698 | Beals | May 9, 1950 |
| 2,589,626 | Paul | Mar. 18, 1952 |

FOREIGN PATENTS

| | | |
|---|---|---|
| 44,657 | Austria | Oct. 25, 1910 |